Dec. 12, 1967     S. B. TUWINER     3,357,823
RECOVERY OF GOLD, SILVER, COPPER AND ZINC BY ALKALINE
CYANIDING WITH ELECTRODIALYSIS
Filed May 8, 1964     2 Sheets-Sheet 2

INVENTOR.
SIDNEY B. TUWINER
BY
Benjamin Sweedler
ATTORNEY 3,357,823
RECOVERY OF GOLD, SILVER, COPPER AND ZINC BY ALKALINE CYANIDING WITH ELECTRODIALYSIS
Sidney B. Tuwiner, Baldwin, N.Y., assignor to Treadwell Corporation, New York, N.Y., a corporation of New York
Filed May 8, 1964, Ser. No. 365,883
5 Claims. (Cl. 75—135)

This invention relates to the recovery of gold, silver, copper and zinc from ores and other materials containing same by treatment with alkaline cyanide leaching or recovering media. Such ores include the ores containing these metals as well as tailings, overburden and other such materials obtained in the treatment of the mined ore from which the bulk of the metal values have been removed.

In this specification, all percentages are given on a weight basis; the expression "alkaline cyanide leaching medium" means the medium employed to treat the ore to recover the metal values; the expression "leach liquor" means the liquor separated from the ore after treatment with the alkaline cyanide leaching medium, which liquor contains dissolved metal values chiefly in the form of a metal cyanide complex; and the expression "wash liquor" means the liquor obtained by washing with water the extracted or denuded solids separated from the leach liquor to recover adherent metal and cyanide values which are present in or on the denuded solids.

In the treatment of ores containing gold and silver by leaching with alkaline cyanide media, complex cyanides of the precious metal are formed which are soluble in the cyaniding media. The denuded solids are separated from the leach liquor. The latter is treated with acid to precipitate the precious and base metals as cyanides, sulfides or other insoluble metal salts, depending upon the ore treated. Upon subjecting the acidified mixture to clarification or filtration to remove the precipitate, a solution is obtained containing most or all of the cyanide of the starting solution as hydrogen cyanide. Neutralization of this solution with lime or other alkali such as caustic soda restores the cyanide solution for further cyanidation of the ore.

In the practical application of cyaniding ores containing precious metals, such as gold or silver, large amounts of wash water are required to remove the cyanide and precious metal values which remain entrapped in the barren residue or denuded solids after the leaching. The leach liquors obtained in the treatment of ores containing precious metals such as gold and silver cannot be combined with the wash liquors because of the increased volume resulting from this dilution which would render it uneconomic to treat such large volumes of liquid for recovery of the cyanide and metal values therein. The leach liquor, after precipitation of gold, silver and other metals to be recovered therefrom, is returned to the process for treatment of additional ore and hence cannot be diluted with the large volume of wash liquor for satisfactory operation.

In the treatment of gold-containing ores, to avoid this dilemma, the wash liquor is separately treated from the leach liquor, i.e., these liquors are separately acidified, usually with sulfuric acid, to convert metal cyanides to hydrogen cyanide and insoluble metal salts. After removal of the precipitated metal salts from the wash liquor containing hydrogen cyanide, this wash liquor is blown with a stream of air or nitrogen to remove the hydrogen cyanide from the solution. This gas stream containing hydrogen cyanide is passed through an absorption column where it is scrubbed with an alkaline solution to recover the cyanide in the gas stream. The gas leaving the absorption column is recycled for blowing more of the acidulated solution. The alkaline cyanide thus produced can be added to the leaching medium.

This procedure of recovering the cyanide values in the wash liquor is objectionable for a number of reasons, among which may be mentioned that it requires a large and expensive installation for blowing the cyanide solution and for adsorption of hydrogen cyanide from the large volume of air or other inert gas employed as the blowing medium. Moreover, the circulating stream of gas must be carefully and thoroughly enclosed to avoid leaks of the toxic hydrogen cyanide. Employing air as the blowing medium, as has been common practice, frequently results in consumption of cyanide, particularly where the solution contains sulfide which in the presence of metallic compounds becomes oxidized to free sulfur. The sulfur thus produced reacts with the cyanide to form thiocyanate with consequent loss of cyanide values to the process.

The copper content of the so-called low grade copper sulfide ores, for example, those obtained as tailings from the treatment of copper ores containing approximately 0.5% copper or more which after grinding and froth flotation result in the production of tailings containing approximately 0.2% copper or less, cannot be mechanically separated by froth flotation chiefly because of the fine particle size of the copper salts and because the particles containing copper are widely disseminated or scattered in the gangue. Acid leaching of such tailings is uneconomic because the large amount of acid required to recover the small amount of copper in the gangue renders acid leaching techniques prohibitively expensive.

When recovering the copper content of such low grade copper sulfide ores by extraction with an alkaline cyaniding medium, it is necessary to recover the copper and cyanide values adhering to the denuded solids separated from the leach liquor. Unless this is done the economics of the process becomes unattractive. Washing the denuded solids to remove soluble copper cyanide complex results in a dilute wash solution of such large volume that as a practical matter it cannot be added to the leach liquor because so to do would result in excessive handling costs.

Acidification of the wash liquor with sulfuric acid to precipitate the copper as cuprous cyanide and produce a dilute solution of HCN results in the production of such a dilute HCN solution that recovery of HCN therefrom, as a practical matter, by blowing with an inert gas and absorbing the HCN in the gas stream in an alkaline solution, is not economically attractive. This is because of the large and costly equipment required for recovery of the HCN by stripping with an inert gas such as air or nitrogen and recovering the HCN from the inert gas stream, for example, by contact with a calcium hydroxide solution or by other known technique for recovering the HCN from such dilute solution.

It is a principal object of this invention to provide an economically attractive process for recovering the metal and cyanide values in the wash liquor obtained in the treatment of the denuded or barren solids and effecting the introduction of the recovered metal and cyanide values into the leach liquor, and this without excessive dilution of the leach liquor.

It is another object of this invention to provide such process in which the metal and cyanide values are thus recovered and introduced into the leach liquor at a point in the process resulting in the production of a relatively concentrated leach liquor from which the metal values can be recovered by treatment with acid, producing an acid leaching solution which can be neutralized to form the alkaline leaching medium for recycle to the ore leaching treatment.

Other objects and advantages of this invention will be apparent from the following detailed description thereof taken in connection with the accompany drawings, in which.

Figure 1:
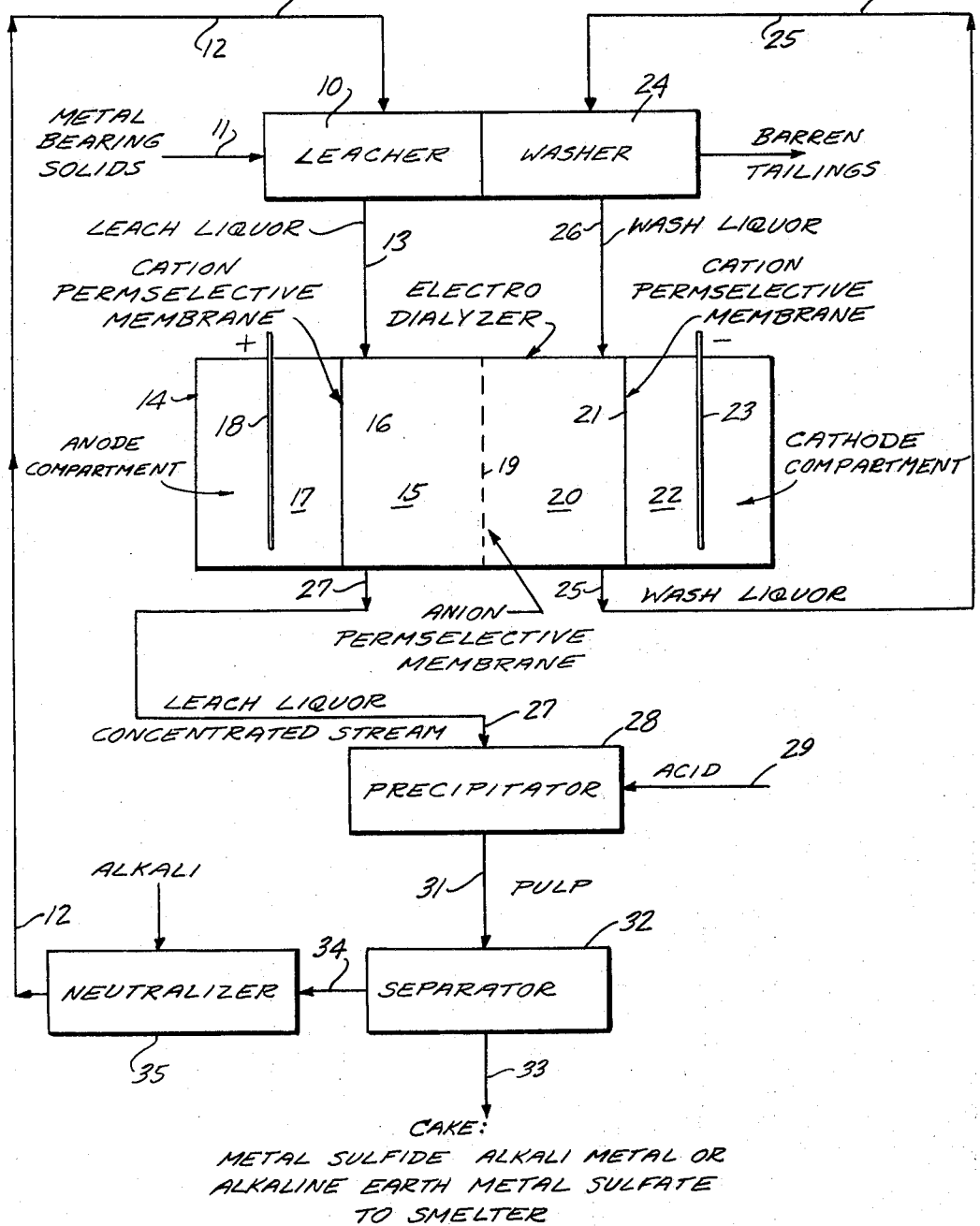
FIGURE 1 is a flow sheet of a batch process for the recovery of a metal from metal-bearing solids by alkaline cyanidation and shows diagrammatically the steps of the batch process embodying this invention.

In accordance with this invention, an ore or other material containing gold, silver, copper and/or zinc values is leached with a solution of an alkali metal or alkaline earth metal cyanide to recover the bulk of the recoverable metal values as a soluble complex of the recoverable metal from the ore with the alkali metal or alkaline earth metal cyanide. The expression "recoverable metal" is used herein to refer to the gold, silver, copper or zinc present in the ore or other solid mixture subjected to treatment and as distinguished from the alkali metal, e.g., sodium or potassium or alkaline earth metal, e.g., calcuim or magnesium, employed in effecting the recovery and complexed with the recoverable metal as a water-soluble cyanide complex. This leaching treatment can be carried out in any manner known to the art involving intimate contact between the ore or other material containing the recoverable metal and the alkaline cyanide leaching medium containing sufficient cyanide to form a water-soluble recoverable metal cyanide complex with the alkali or alkaline earth metal. For the leaching of gold, silver, copper or zinc present as metal salt other than the metal sulfide from solids containing same, at least two molecular equivalents of hydrogen cyanide are required for each atom equivalent of the metal. For the cyanidation of chalcocite or cuprous sulfide, four equivalents of cyanide are required for each atom of copper.

At the end of the leaching step, the leach liquor containing dissolved recoverable metal is removed and desirably the partially denuded ore is treated with fresh cyanide solution to insure completeness of metal recovery. The leaching with the fresh cyanide solution is stopped as soon as it is apparent that continuation of metal dissolution into the alkaline cyanide leaching medium is no longer taking place. The cyanide solution thus obtained is mixed with the initial cyanide solution, i.e., the rich solution.

The barren solids, in accordance with this invention, are washed with the diluting stream effluent (wash liquor) of an electrodialysis unit. This diluting stream is the exit stream from the electrodialysis unit from which dissolved recoverable metal has been transferred by electodialysis into the leach liquor passing through the electrodialysis unit in contact with one side of an anion-permselective membrane or barrier; the wash liquor flows in contact with the other side of this membrane or barrier.

The electrodialyzer used can be of any known type involving one or more cells through each of which the wash liquor and leach liquor flow separated by an anion-permselective membrane and having a cation-permselective membrane separating the anode and cathode compartments from the compartment containing the anion-permselective membrane. The anion-permselective membrane or barrier and the cation-permselective membrane or barrier are arranged in spaced relation, as is well known in the art and as diagrammatically illustrated on the drawings. The anion and cation-permselective membranes or barriers, which are also termed in the art as anion and cation exchange membranes respectively, can be any of the known ion-permselective membranes through which the recoverable metal cyanide anions will pass, such as the ion-exchange resins disclosed in United States Patents 2,636,852; 2,631,319; 2,681,320; 2,702,272; 2,731,408; 2,731,411; 2,731,425; and 2,731,426 and including quaternary ammonium resins employed as anion exchange membranes and sulfonated resorcinols and styrenes employed as cation exchange membranes. Preferred for the cation exchange membrane is the commercial membrane Nepton CR–61 and for the anion exchange membrane is the commercial membrane Nepton AR–111A, both commercially available from Ionics, Incorporated, the assignee of United States Patents 2,731,425; 2,731,411; 2,731,408; 2,702,272 and 2,636,852.

It will be appreciated that the electrodialysis apparatus can be of any known type including the spirally wound type disclosed in United States Patent 2,741,595. In all types the leach liquor or rich solution flows on one side of an anion-permselective membrane, the wash liquor or diluting stream on the other side of this anion-permselective membrane, the said streams flowing through one or more such cells each containing such permselective membranes in an electrodialyzer having an anode compartment and a cathode compartment provided with electrodes charged with any desired potential customarily used to obtain ionizable salts and complexes in the liquid streams flowing therethrough. Hence as the dilute solution flows through each cell, ions of recoverable metal cyanide pass through the ion-permselective membrane into the leach liquor or rich solution, simultaneously impoverishing the dilute solution with respect to its recoverable metal cyanide values. When transfer of recoverable metal anion cyanide from the wash liquor to the leach liquor no longer takes place, flow through the dialyzer of the respective streams is discontinued. In this way dissolved recoverable metal cyanide entrapped in the barren solids is transferred to the leach liquor passing through the electrodialyzer without excessive dilution of the leach liquor.

I have found that the complex cyanide anionic complexes of gold, silver, copper and zinc are transferred from the diluting stream of the dialyzer to the leach liquor or rich stream through the anion-permselective membrane. This is indeed surprising because the complexity of these anions would lead one to expect that satisfactory removal of recoverable metal values in the form of cyanide complex from the wash liquor to the leach liquor could not be effected by electrodialysis. I have found, however, that not only is this feasible but it can be effected more readily and with lower expenditure of electrical energy than is necessary for effecting transfer of free cyanide.

In a batch operation, as shown in FIGURE 1, the metal bearing solids are introduced into a leacher 10 of any known type such as a tank having a sand-bed with a perforated or false bottom on which the bed rests for drainage. This tank can be provided with the necessary equipment for circulating the liquid employed in leaching the metal bearing solids. Alternatively, the leacher 10 can be designed to hold a desired batch of metal bearing solids introduced through line 11 and of the alkaline cyanide leaching medium introduced through line 12, with provision for agitating the mixture. The leaching medium and the metal bearing solids are maintained in contact with each other in leacher 10 until the desired dissolution of recoverable metal into the leaching medium has been effected. Thereafter the leach liquor is passed through line 13 into the electrodialyzer 14, flowing through the passageway 15, the opposite sides of which are defined by a cation-permselective membrane 16 separating passageway 15 from the anode compartment 17 having therein the anode 18 and an anion-permselective membrane 19. This membrane 19 defines one side of the passageway 20 through which the wash liquor flows as hereinafter more fully described. Passageway 20 has its opposite side defined by the cation-permselective membrane 21 which separates passageway 20 from the cathode compartment 22 having therein the cathode 23.

The denuded solids are transferred from the leacher 10 to the washer 24. Here the denuded solids are washed with the dilute stream which exits from the electrodialyzer 14 through line 25 and is circulated through the washer 24 for return to the electrodialyzer 14 through line 26.

When starting up, after leaching of the batch has been completed in leacher 10 and the leach liquor separated and introduced into a storage tank for flow through the electrodialyzer 14, water is initially used in the washer 24. The solution produced by flow of this water through the washer 24 enters the electrodialyzer 14 at 26 and flow of the leach liquor is then commenced through passageway 15 of the electrodialyzer so that throughout the flow of the leach liquor through passageway 15 wash liquor from washer 24 flows on the opposite side of the anion-permselective membrane through passageway 20. The wash liquor leaves the electrodialyzer through line 25 and is recirculated through the washer 24 and passageway 20 of the electrodialyzer 14.

The leach liquor thus further concentrated by removal of recoverable metal from the wash liquor flows through line 27 into the precipitator 28 into which acid is introduced, preferably sulfuric acid, through line 29. In the precipitator 28, when sulfuric acid is used, the recoverable metal is precipitated as the insoluble sulfide and cyanide values are converted to hydrogen cyanide. The resultant mixture is passed through line 31 into a separator 32, which can be a filter, centrifugal separator or other suitable separator. Here separation of the solids, e.g., mixture of metal sulfide and alkali metal or alkaline earth metal sulfate is effected from the liquor, the solids are withdrawn through line 33 and can be passed to a smelter or other recovery unit for converting the metal sulfide to pure metal. The liquid flows through line 34 into neutralizer 35 where the alkaline material, e.g., lime or caustic soda, is added to neutralize the acid and produce the leaching medium introduced into the leacher 10 through line 12.

Figure 2:
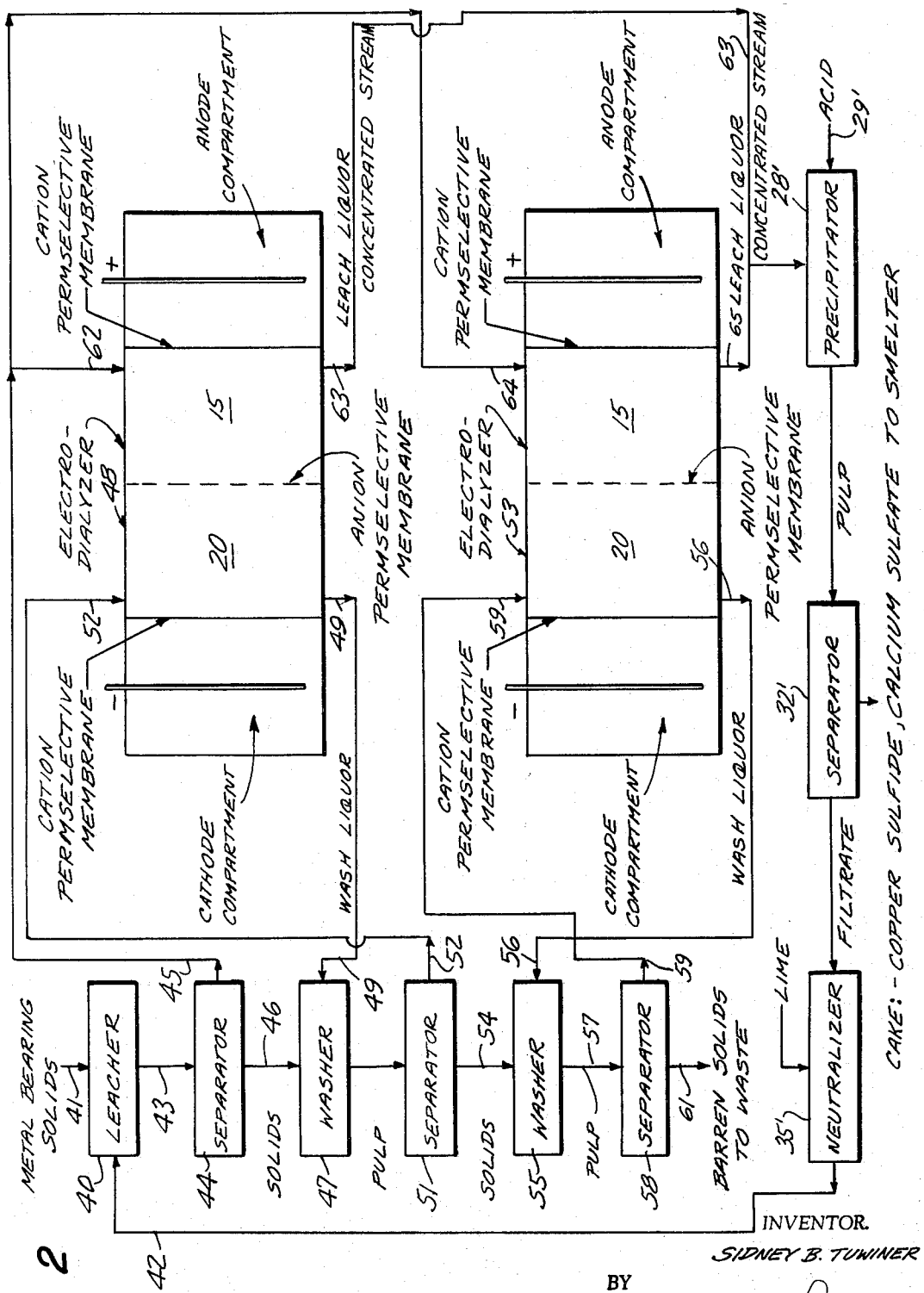
FIGURE 2 is a flow sheet showing for illustrative purposes a preferred continuous process for recovering metal from metal-bearing solids.

In continuous operation, as shown in FIGURE 2, the ore tailings or other solids containing recoverable material is leached with the alkaline cyanide leaching medium, both supplied continuously to the leacher 40 of any known type for effecting continuous leaching. The leacher 40, shown in FIGURE 2, is provided with a metal bearing solids feed line 41 and a line 42 through which the alkaline cyanide leaching medium is introduced into the leacher 40. From the leacher 40 the mixture flows through line 43 into the separator 44, which can be a clarifier, filter or other known separator. Leach liquor is withdrawn from separator 44 through line 45 and denuded solids discharged through line 46. The denuded solids are conveyed continuously into the washer 47 which is supplied with a dilute stream of liquid (wash liquor) from the electrodialyzer 48. The wash liquor stream from the electrodialyzer 48 flows continuously through line 49 into the washer 47 and thence to the separator 51 from which the wash liquor flows through line 52 into the inlet end of the passageway 20 in the electrodialyzer 48. This electrodialyzer 48, as well as electrodialyzer 53 shown in FIGURE 2, can be of the same general type as that of FIGURE 1 and hence corresponding parts thereof have been identified by the same reference characters.

The partially washed solids from the separator 51 flow through line 54 into a second washer 55 where the solids are washed with the dilute stream (wash liquor) circulating through the electrodialyzer 53; this liquid stream flows from the electrodialyzer 53 through line 56 into the washer 55. The mixture of liquid and solids from washer 55 flow thorugh line 57 into the separator 58 from which the wash liquor flows through line 59 into the inlet end of the passageway 20 of the electrodialyzer 53. The washed barren solids leaving the separator 58 can be discharged to waste through line 61.

As indicated in FIGURE 2, a portion of the leach liquor flows continuously through branch line 62 through passageway 15 of the electrodialyzer 48 where transfer of metal cyanide anions from the wash liquor flowing through passageway 20 in this electrodialyzer takes place to the leach liquor flowing through 15. The thus concentrated leach liquor flows continuously through line 63 into the tank or precipitator 28' equipped with acid feed line 29', which precipitator is substantially the same in structure and function as the precipitator 28 hereinabove described in connection with FIGURE 1. The remainder of the leach liquor flows continuously through branch 64 into and through the passageway 15 of the electrodialyzer 53. In this electrodialyzer transfer of metal cyanide anions takes place from the wash liquor flowing continuously through channel 20 on the opposite side of the anion-permselective membrane separating passageways 20 and 15 in electrodialyzer 53. The enriched leach liquor flows continuously through exit line 65 into the precipitator 28'.

The separator 32' and neutralizer 35' in FIGURE 2 are the same in structure and function as the corresponding members of FIGURE 1 and hence further description thereof would serve no useful purpose.

The following examples are given to illustrate preferred embodiments of the invention. Examples I and II involve the recovery of copper from an alkaline copper sulfide ore containing less than about 0.2% copper widely disseminated in a gangue so that as a practical matter recovery of the copper content could not be effected economically by heretofore known existing techniques, including acid leaching or flotation techniques. Example III involves the treatment of a deslimed ore containing gold, silver and cyanide extractable copper. It will be understood that this invention is not to be limited to these examples.

*Example I*

24,000 pounds of a deslimed chalcocite flotation tailings containing 0.5% of cyanide leachable copper are loaded in a steel tank 8 feet in diameter and 6 feet deep having a sand-bed therein and a false bottom for drainage of the sand-bed and provided with equipment for circulating through the tank calcium cyanide leaching medium and also the wash liquid.

Recovery of the copper is effected by flowing a calcium cyanide solution through the tailings. This solution contains 6.55 grams per liter of hydrogen cyanide. 750 gallons of the solution is passed through the tailings and the resultant solution, termed "leach liquor," collected for flow through the electrodialyzer during the next washing step. The solution thus obtained contains 3.85 grams of copper per liter.

After separation of the leach liquor, the denuded tailings at a temperature of 65° F. is first washed with water at 120° F. The flow of warm wash solution continues and as soon as noticeable content of copper cyanide complex is apparent, determined by analysis of a sample of wash liquid is passed through an electrodialyzer as the diluting stream feed. The electrodialyzer is a commercially available unit containing sulfonated styrene cation exchange membrane and a commercially available quaternary ammonium anion exchange membrane. The exit of this diluting stream from the dialyzer is returned to wash the denuded tailings and the wash liquor recycled through the electrodialyzer, throughout the wash cycle of the process. Simultaneously the leach liquor is passed through the dialyzer on the other side of the anion exchange membrane; the latter separates the stream of leach liquor from the stream of wash liquor passing through the dialyzer. In all, 750 gallons of the wash liquor flows through the electrodialyzer; initially the copper concentration in the wash liquor entering the electrodialyzer is 1.80 grams per liter. At the end of the cycle it has fallen to 0.238 gram per liter.

The leach liquor leaving the electrodialyzer contains 5.38 grams of copper per liter; as noted, the leach liquor entering the dialyzer contains 3.85 grams of copper per liter. Thus on the average, 1.53 grams of copper per liter of solution are transferred from the wash liquor to the leach liquor.

The total time of the wash cycle is 30 hours. Thus the flow rates of both the wash liquor and the leach liquor through the electrodialyzer averages 25 gallons per hour.

Enriched leach liquor flows continuously to a precipitation tank; 98% sulfuric acid is introduced into the tank in amount controlled to maintain a pH of 5.5. A slurry containing 5.38 grams per liter of copper as a precipitate of cuprous sulfide and an equivalent amount of gypsum is thus obtained. This slurry is thickened and the underflow from the thickener filtered on a continuous vacuum drum filter. The filter cake is washed with water. The overflow from the thickener, the filtrate from the vacuum drum filter and the wash solution are combined and neutralized with lime to a pH of 12 to produce the alkaline leaching medium employed to effect the leaching of the copper from the tailings.

*Example II*

In this example deslimed chalcocite flotation tailings containing 0.15% of cyanide extractable copper is treated with a solution of calcium cyanide containing four equivalents of hydrogen cyanide for each atom of recoverable copper. There is thus obtained a leach liquor containing 3.6 grams of copper per liter. This leach liquor is passed through the electrodialyzer, of the same type as used in Example I. Washing of the denuded solids with water produced a stream containing 1.8 grams of copper per liter. This stream is passed through the electrodialyzer on the other side of the anion-permselective membrane so that the two streams flow on opposite sides of this membrane.

Leaving the electrodialyzer, the leach liquor contained 5.05 grams of copper per liter; the wash liquor contained 0.45 gram of copper per liter. This wash liquor is used to wash the barren solids producing the wash liquor passed through the electrodialyzer to increase the concentration of copper cyanide in the leach liquor obtained by the leaching of a subsequent batch of the chalcocite tailings.

The enriched leach liquor is treated with sulfuric acid to precipitate copper sulfide and calcium sulfate. This precipitate is separated from the liquid and treated, for example, in a smelter to convert the copper sulfide to pure copper.

*Example III*

A deslimed ore containing 0.055 ounce per ton of gold, 0.20 ounce of silver and 0.01% of cyanide extractable copper is treated with a solution of sodium cyanide containing four equivalents of hydrogen cyanide for each atom of recoverable copper and two equivalents of hydrogen cyanide for each atom of gold and silver. There is thus obtained a leach liquor containing 2.4 grams of copper per liter of solution and 0.23 ounce of gold and 0.08 ounce of silver per ton of solution. This leach liquor is passed through the electrodialyzer as the concentrating stream. Washing of the denuded solids produced a wash stream containing 1.2 grams of copper per liter of solution and 0.012 ounce of gold, 0.04 ounce of silver per ton of solution. This wash stream is sent to the same electrodialyzer and constitutes the diluting stream. The electrodialyzer is of the same type as used in Example I.

Leaving the electrodialyzer the leach liquor contained 3.37 grams of copper per liter of solution and 0.278 ounce of gold and 1.0 ounce of silver per ton of solution; the diluting stream contained 0.025 ounce of gold and 0.09 ounce of silver per ton of solution, and also 0.3 gram of copper per liter of solution. This solution is used in recycle to wash the denuded solids from the leaching step.

The enriched leach liquor of the concentrating stream from the electrodialyzer is treated with zinc dust to precipitate the silver and gold as well known in the art. The silver and gold sludge produced in this manner is smelted to produce a precious metal bullion for refining. The liquor from which the gold and silver have been thus removed is treated with sulfuric acid to precipitate cuprous sulfide and calcium sulfate, as in Example II. This precipitate is separated from the liquid and smelted to convert the cuprous sulfide to metallic copper.

An important objective accomplished by this invention is the conservation of wash water for washing denuded or barren solids with consequent reduction in the volume of weak cyanide waste solutions requiring disposal. In a preferred embodiment of this invention involving recirculation of the wash liquor through the electrodialyzer and utilization of the effluent from the electrodialyzer for washing the barren or denuded solids, the necessity of disposing of weak cyanide waste solutions is eliminated completely.

The respective solutions passed through the electrodialyzer preferably should be warm, i.e., at a temperature within the range of from 80° to 120° F. Operating at such temperatures not only facilitates the washing of the denuded solids but also improves the capacity of the electrodialysis membranes. In both the batch or continuous process it is preferred to recycle the full volume of wash effluent through the electrodialysis unit. This has the advantage of eliminating the necessity of disposing of toxic, weak cyanide solution.

Since certain changes can be made in carrying out the above disclosed process for recovering metal, i.e., gold, silver, copper or zinc, from metal-bearing solids without departing from the scope of this invention, it is intended that all matter contained in this description or in the accompanying drawings shall be interpreted as illustrative and not in a limiting sense.

What is claimed is:

1. The process of recovering a metal from the group consisting of gold, silver, copper and zinc from solid material containing same, which process comprises:

step 1, leaching the solid material with an alkaline cyanide leaching medium to dissolve the metal in the alkaline cyanide leaching medium and produce a leach liquor containing the dissolved metal;

step 2, flowing the leach liquor from step 1 in contact with one side of an ion exchange membrane of an electrodialyzer while flowing on the other side a stream of wash liquor obtained from step 3, thus transferring metal cyanide from the wash liquor to the leach liquor; and step 3, washing the denuded solid material from step 1 to remove adherent metal cyanide values, employing the wash liquor effluent from step 2.

2. The process of recovering copper from a copper-containing ore, which process comprises:

step 1, leaching the ore with an alkaline cyanide leaching medium to dissolve the copper in the alkaline cyanide leaching medium as a copper complex and separating the denuded solids from the leach liquor;

step 2, washing the denuded solids from step 1 to remove adherent copper cyanide values, employing effluent wash liquor obtained from step 3; and step 3, subjecting the leach liquor to electrodialysis by flow on one side of an ion exchange membrane on the other side of which flows a stream of wash liquor obtained from step 2, thus transferring copper cyanide anions from the wash liquor to the leach liquor.

3. The process of recovering copper from copper ores, which process comprises:

step 1, leaching the ore with calcium cyanide leaching medium to dissolve the copper and separating the copper solution from the denuded solids;

step 2, subjecting the solution from step 1 to electrodialysis by flow on one side of an ion exchange membrane on the other side of which flows a stream of wash liquor obtained from step 3, thus transferring copper cyanide anions from the wash liquor to the solution to enrich the solution;

step 3, washing the denuded solids material from step 1 to remove adherent copper cyanide values, employing the wash liquor exiting from the dialysis treatment of step 3; and step 4, recovering the copper from the enriched solution exiting from step 2.

4. The process of recovering copper from low grade copper sulfide ore, which process comprises the following steps:

step 1, leaching the ore with an alkaline cyanide leaching medium and separating the resultant leach liquor from the denuded solids;

step 2, washing the denuded solids with wash liquor obtained as the diluting stream from an electrodialyzer employed in step 3;

step 3, flowing the leach liquor from step 1 and the wash liquor from step 2 through an electrodialyzer on opposite sides of an anion-permselective membrane and recycling the wash liquor from the dialyzer through step 2;

step 4, removing the enriched leach liquor from step 3 and treating same with sulfuric acid to precipitate cuprous sulfide; and step 5, separating the precipitate from the liquor and neutralizing the liquor with alkali to produce the alkaline cyanide leaching medium used in step 1.

5. The process of recovering copper from low grade copper sulfide ore, which process comprises the following steps:

step 1, leaching the ore with a calcium cyanide leaching medium and separating the resultant leach liquor from the denuded solids;

step 2, washing the denuded solids with wash liquor obtained from step 3 to recover copper and cyanide values in the denuded solids;

step 3, flowing the leach liquor from step 1 and the wash liquor from step 2 on opposite sides of an anion-permselective membrane of an electrodialyzer to transfer copper cyanide ions from the wash liquor to the leach liquor and passing the wash liquor exiting from step 3 to step 2;

step 4, removing the enriched leach liquor from step 3 and treating same with sulfuric acid to precipitate copper sulfide and calcium sulfate, and separating the precipitate from the liquor;

step 5, neutralizing the liquor from step 4 with lime to form the calcium cyanide leaching medium used in step 1.

References Cited

UNITED STATES PATENTS

| | | | |
|---|---|---|---|
| 759,220 | 5/1904 | Porter | 204—106 |
| 2,648,601 | 8/1953 | Byler et al. | 75—105 |
| 2,694,680 | 11/1954 | Katz et al. | 204—180 |
| 2,739,934 | 3/1956 | Kunin | 204—180 |
| 2,839,387 | 6/1958 | Burton et al. | 75—105 |
| 3,224,835 | 12/1965 | Hockings et al. | 23—135 |

JOHN H. MACK, *Primary Examiner.*

A. C. PRESCOTT, *Assistant Examiner.*